(12) United States Patent
Dreisinger et al.

(10) Patent No.: US 8,361,191 B2
(45) Date of Patent: Jan. 29, 2013

(54) LOW ACID LEACHING OF NICKEL AND COBALT FROM LEAN IRON-CONTAINING NICKEL ORES

(75) Inventors: David Dreisinger, Delta (CA); James Clucas, Vancouver (CA)

(73) Assignee: Search Minerals, Inc. (CA)

( * ) Notice: Subject to any disclaimer, the term of this patent is extended or adjusted under 35 U.S.C. 154(b) by 168 days.

(21) Appl. No.: 13/013,608

(22) Filed: Jan. 25, 2011

(65) Prior Publication Data

US 2012/0186398 A1    Jul. 26, 2012

Related U.S. Application Data

(60) Provisional application No. 61/341,645, filed on Apr. 1, 2010.

(51) Int. Cl.
    *C22B 3/06*     (2006.01)
    *C22B 23/00*     (2006.01)

(52) U.S. Cl. ............ 75/739; 75/743; 423/139; 423/140; 423/150.1; 205/589; 205/594

(58) Field of Classification Search ............... 75/743, 75/739; 423/139, 140, 150.1; 205/589, 594
See application file for complete search history.

(56) References Cited

U.S. PATENT DOCUMENTS

| 3,082,080 A | 3/1963 | Simons |
| 5,571,308 A | 11/1996 | Duyvesteyn et al. |
| 7,871,584 B2* | 1/2011 | Liu et al. ............... 423/150.4 |
| 2002/0006370 A1* | 1/2002 | Arroyo et al. ............... 423/150.1 |

FOREIGN PATENT DOCUMENTS

| EP | 1731623 A | 12/2006 |
| GB | 101285 A | 5/1917 |
| GB | 1387269 A | 3/1975 |

* cited by examiner

*Primary Examiner* — George Wyszomierski
*Assistant Examiner* — Tima M McGuthry Banks
(74) *Attorney, Agent, or Firm* — Kilpatrick Townsend & Stockton LLP.; M. Henry Heines

(57) ABSTRACT

In various aspects, the invention provides processes that use relatively low levels of acid to leach lean nickel ores, including processes that provide relatively high levels of extraction of nickel and cobalt from nickel laterite ores, in conjunction with relatively low levels of iron extraction.

15 Claims, 4 Drawing Sheets

LOW ACID LEACHING OF NICKEL AND COBALT FROM LEAN IRON-CONTAINING NICKEL ORES

CROSS REFERENCE TO RELATED APPLICATION

The invention claims the benefit of U.S. Provisional Patent Application No. 61/341,645, filed Apr. 1, 2010, the contents of which are incorporated herein by reference.

FIELD OF THE INVENTION

The invention pertains to methods for recovering nickel and cobalt from lean ores, including methods of using starvation levels of acid for prolonged periods of time to leach nickel and cobalt from lean ores that also contain iron.

BACKGROUND OF THE INVENTION

Nickel laterite ores are oxidized or weathered ores that typically occur in tropical areas where there has been an opportunity for mineralogical transformation from the original mineral deposit to a lateritic profile. Nickel laterites are expected to be an increasing source of nickel for the world market due to inadequate resources of nickel sulphide deposits.

The nickel laterite deposits fall broadly into two categories, limonite laterite deposits and saprolite laterite deposits. The limonite deposits have nickel contained substantially within an iron oxy-hydroxide mineral called goethite. The recovery of nickel from these limonite ores usually requires treatment of the whole ore using hydrometallurgy (although in some cases physical upgrading may be possible), possibly after an initial pyrometallurgical treatment. The direct hydrometallurgy route generally applied is high pressure acid leaching (HPAL). This process generally uses ~245-270° C. autoclave leaching of the limonite with sulphuric acid to dissolve the goethite and re-precipitate hematite. The nickel and cobalt contained within the goethite mineral are released during the high pressure acid leach and subsequently recovered from solution following a solid-liquid separation, solution purification and recovery of a nickel product (for example, nickel metal cathode, nickel metal or nickel oxide powder, mixed hydroxide precipitate or mixed sulphide precipitate). An alternative process is the Caron process which first subjects the limonite to a reduction roast process to recrystallize the goethite to hematite and reduce nickel, cobalt and some iron to the metallic state. The calcine from the reduction roast is then oxidatively leached in a solution of ammonia-ammonium carbonate to dissolve nickel and cobalt. This solution then advances to metal recovery for nickel and cobalt.

Saprolite laterite deposits contain basic minerals that are concentrated in magnesium silicates. Magnesium silicates consume excessive amounts of acid in HPAL. The Caron process may be used for saprolites but recovery is generally low. Commonly, smelting is applied to saprolites to produce either a Fe—Ni (ferro nickel) product or a Ni—Co—S matte. The ferro nickel product can be used to make stainless steel and the nickel-cobalt-sulphur matte can be refined to nickel and cobalt metal.

In general, processes involving sulphation require the use of aqueous or concentrated sulphuric acid or can be conducted with sulphurous gases (sulphur dioxide and sulphur trioxide) as the sulphating agent (Canterford, J. H. (1975), "The Treatment of Nickelferous Laterites", *Minerals Sci. and Eng.* 7: 3-17 (Canterford)). Alternatively, sulphuric acid may be produced "in-situ" by oxidation of sulphur, pyrite or other metal sulphides (CA922,903). This process chemistry combines high temperature oxidation of sulphides with high temperature leaching of laterite ores. In many instances, the leach liquors that are produced by sulphation processes are highly contaminated, and there are accordingly many recovery procedures that may be used to isolate nickel and cobalt or to remove contaminants. For example, dissolved iron may be removed by using either a jarosite process or a goethite process. Other procedures involve the selective cementation of nickel by iron, or the selective precipitation of a high-grade sulphide product using activated pyrrhotite.

Atmospheric laterite leaching processes have also been described. The use of a high temperature autoclave pressure vessel may for example be avoided through the use of "pug roasting" in which the acid is added directly to the laterite feed followed by roasting (Canterford). Acid leaching under reflux conditions at atmospheric pressure has however been reported to result in the generation of a contaminated liquor. In addition, high acid concentrations and extended leaching times have been used in examples reporting high levels of recovery of the contained nickel and cobalt (Canterford). One problem with this process is the generation of waste liquors that may be difficult to treat. For example, after nickel and cobalt recovery, an acid ferric sulphate solution may result, and the disposal of this liquor may be problematic (Canterford).

In an atmospheric leaching treatment, as for example disclosed in U.S. Pat. No. 6,261,527, the leaching reactions for limonite leaching can be specified as follows:

$$2FeO(OH) + 3H_2SO_4 = Fe_2(SO_4)_3 + 4H_2O$$

$$NiO + H_2SO_4 = NiSO_4 + H_2O$$

$$CoO + H_2SO_4 = CoSO_4 + H_2O$$

$$MgO + H_2SO_4 = MgSO_4 + H_2O$$

$$ZnO + H_2SO_4 = ZnSO_4 + H_2O$$

$$CuO + H_2SO_4 = CuSO_4 + H_2O$$

$$Al_2O_3 + 3H_2SO_4 = Al_2(SO_4)_3 + 3H_2O$$

$$Cr_2O_3 + 3H_2SO_4 = Cr_2(SO_4)_3 + 3H_2O$$

$$MnO + H_2SO_4 = MnSO_4 + H_2O$$

$$MnO_2 + SO_2 = MnSO_4$$

The result of atmospheric leaching of limonites is generally the dissolution of large amounts of iron, aluminum and other elements along with nickel and cobalt, hence the importance of the saprolite leaching/jarosite precipitation step. Saprolite leaching consumes excess acid and drives the precipitation of jarosite or goethite precipitates.

For the purpose of writing saprolite reactions, the "serpentine" mineral may be represented as a hydrated magnesium silicate $Mg_3[Si_2O_5](OH)_4$. Alkali cations are added to provide species for forming alunite and jarosite precipitates. For the purpose of writing reactions, the alkali cation will be provided by sodium chloride (NaCl) and sodium jarosite/alunite will be formed. The saprolite reactions can be specified as follows:

$$Mg_3[Si_2O_5](OH)_4 + 3H_2SO_4 = 3MgSO_4 + 2SiO_2 + 5H_2O$$

$$3Fe_2(SO_4)_3 + 2H_2O + 2Mg_3[Si_2O_5](OH)_4 + 2NaCl = 2NaFe_3(SO_4)_2(OH)_6 + 5MgSO_4 + 4SiO_2 + MgCl_2$$

$$3Al_2(SO_4)_3 + 2H_2O + 2Mg_3[Si_2O_5](OH)_4 + 2NaCl = 2NaAl_3(SO_4)_2(OH)_6 + 5MgSO_4 + 4SiO_2 + MgCl_2$$

An alternative embodiment of atmospheric leaching, incorporating goethite precipitation, has been reported (Liu, H. et al. (2004), "Atmospheric Leaching of Laterites with Iron Precipitation as Goethite", International Laterite Nickel Symposium—2004, Ed. Imrie, W. P., et al., TMS (Warrendale), pp. 347-368), in which no source of alkali cation is provided to drive the formation of jarosite and alunite.

A further alternative process involves direct leaching of highly serpentinized saprolite ores using high strength sulphuric acid in either fresh or seawater (U.S. Pat. Nos. 6,379,637; 6,391,089; and Curlook, W. (2004), "Improvement to the Acid Pressure Leaching of Nickel Laterite Ores", International Laterite Nickel Symposium—2004, Ed. Imrie, W. P., et al, TMS (Warrendale), pp. 325-334).

There are accordingly a range of processes in which large amounts of acid are applied to extract a substantial quantity of nickel from nickel laterite ores.

SUMMARY OF THE INVENTION

The invention provides processes that use relatively low ("starvation") levels of acid to leach lean nickel ores, including processes that provide relatively high levels of extraction of nickel and cobalt from nickel laterite ores, in conjunction with relatively low levels of iron extraction.

In one aspect, the invention provides methods for recovering nickel and/or cobalt and/or by-product metals from a lean ore, such as a nickel laterite ore or a Caron plant tailing material. These methods may involve subjecting the material to a prolonged acid leach with application of starvation levels of acid. An alkali may be added to the leach slurry to neutralize the residual acidity in the slurry and to precipitate metals such as iron, aluminum and chromium as metal hydroxides. The leached ore (or tailing) residue may be separated from the iron/aluminum/chromium free solution to recover nickel and cobalt, for example by a process of mixed hydroxide precipitation, mixed sulphide precipitation, solvent extraction/electrowinning or solvent extraction and hydrogen reduction. In alternative embodiments, the leach slurry after neutralization with alkali may be directed to an "in-pulp" recovery process, such as resin-in-pulp, so as to avoid the separation of leached ore (ore tailing) residue from the iron/aluminum/chromium free solution prior to nickel and cobalt recovery. The final solutions and/or washed ore (or tailing) residue may be subjected to environmental treatment prior to disposal.

DETAILED DESCRIPTION OF THE INVENTION

Figure 1:
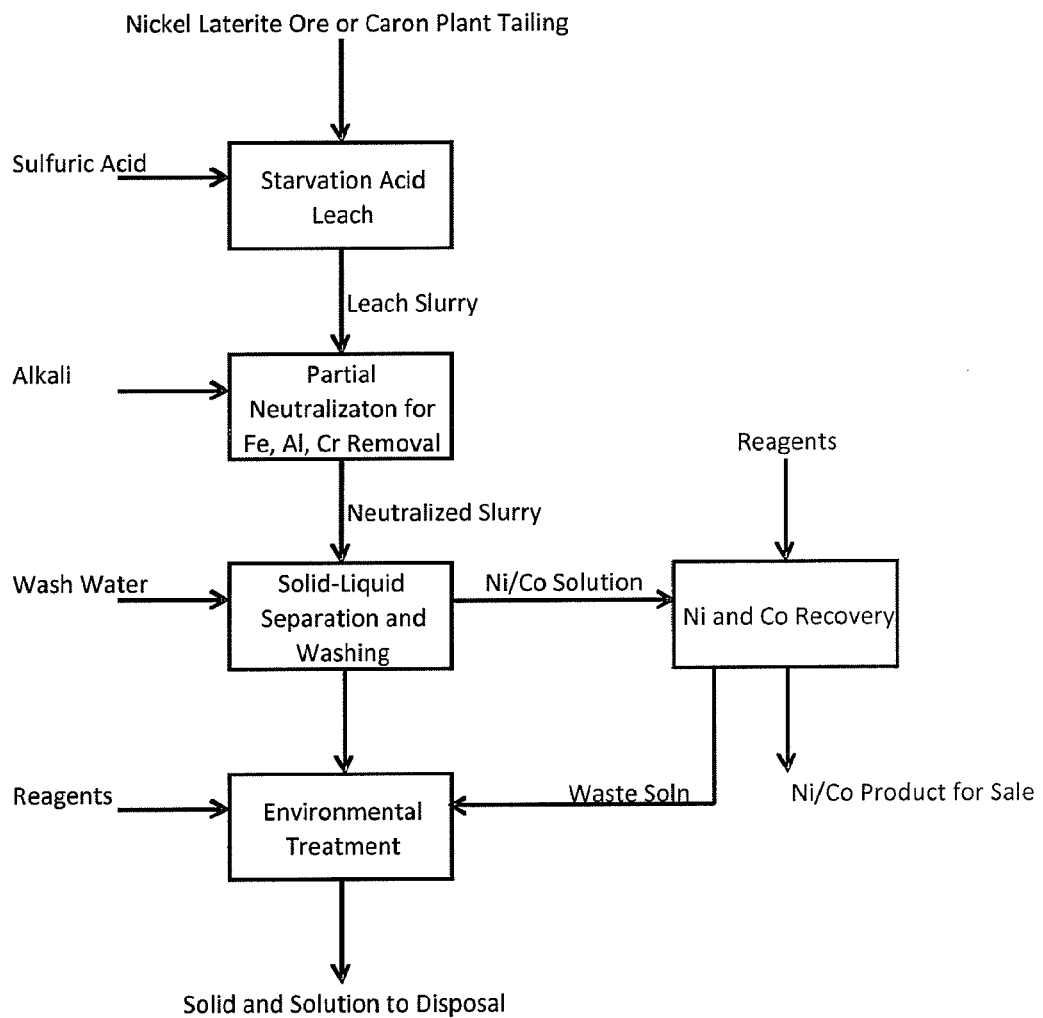
FIG. 1 is a flowsheet showing the leaching of a lean ore with starvation levels of acid followed by partial neutralization to precipitate contaminating elements, the separation of solid from liquid and washing of the residue to produce a nickel and cobalt-containing solution, nickel and cobalt recovery and finally environmental treatment of waste solids and liquid effluents.

In accordance with one aspect of the invention, there is provided a method for recovering nickel, cobalt and by-product metals from a lean ore, shown generally in FIG. 1. The lean ore may for example be a nickel laterite ore or a process residue such as a Caron plant tailing.

In the context of the invention, the phrase "lean ore" may for example refer to a saprolite ore of <1.5% Ni, or <1% Ni. Such ores may also be characterized by a Mg concentration of 10% or more. An alternative lean ore, for example from Caron plant tailings, may be <0.5% Ni and <0.2% Co material. In general, lean ores are ores that are not economic to treat by conventional ferro-nickel or matte smelting.

The ore may for example be prepared as a finely ground slurry using mining, crushing and grinding techniques. In the case of Caron plant tailings, the tailings are generally finely divided and may not require any additional size reduction. The slurry may for example be prepared using fresh water, salt water, brackish water or recycled water. In selected embodiments, the solid content of the slurry may for example be in the range of about 2% to about 65%, or at a level where the minimum content of water is added while still maintaining acceptable rheological properties for the slurry.

The Examples herein illustrate embodiments in which it has proved possible to treat the slurry with starvation quantities of acid while producing an acceptable nickel and cobalt extraction without incurring an unnecessarily large acid consumption. To provide acceptable conditions to achieve this extraction, the temperature of starvation acid leaching may vary from ambient temperature to near the boiling point of the acid solution; and, the time of leaching may vary from a few hours to a number of days. The mode of contact of the acid and the slurry may for example be in the form of a conventional atmospheric stirred reactor, a vat, a heap or a recirculating thickener. In some embodiments, the underflow and overflow of a recirculating thickener may for example be continuously re-circulated to provide suitable solid/liquid contact.

In order to facilitate cobalt extraction, a reductant may be added to the slurry during leaching. Removal of iron from solution may be promoted by the addition of an alkali and by aerating or oxygenating or adding a chemical oxidant to the slurry to oxidize ferrous iron (Fe(III)) to ferric iron (Fe(II)) such that an iron-containing precipitate may form. The leach slurry may include partially leached ore solids and a solution containing dissolved nickel, cobalt and various contaminating elements such as iron, aluminum, silica, chromium, zinc, magnesium, manganese or copper. In some embodiments, the leachate maybe subjected to a partial neutralization to precipitate contaminating elements prior to a nickel recovery step. This precipitation may for example be carried out using a suitable source of alkali, such as limestone, lime, magnesia, soda ash, sodium hydroxide or any another alkali. In selected embodiments, the temperature for partial neutralization may fall in the range of ambient up to about the boiling point of the acid. The pH for the partial neutralization may vary with the temperature used, and in selected embodiments will generally fall in the range of pH from about 3.5 to about 5.5.

After partial neutralization, the leach slurry may be subjected to a solid-liquid separation and washing process in order to separate a nickel and cobalt-containing solution from the partially leached solids. This may for example be accomplished in conventional or high-rate or deep bed thickeners arranged in a counter-current fashion to provide effective washing of the solids. In selected embodiments, the number of countercurrent thickeners may be between 6 and 8. The wash ratio (wash water added per unit of solution in the underflow slurry of the thickener expressed as tonnes of wash per tonne of solution) may for example be between about 1.0 and about 3.0 or in the range of about 1.6 to about 2.0. Alternatively, the solids may be filtered and washed with a minimum amount of wash water necessary to effectively wash the solid residue.

Figure 2:
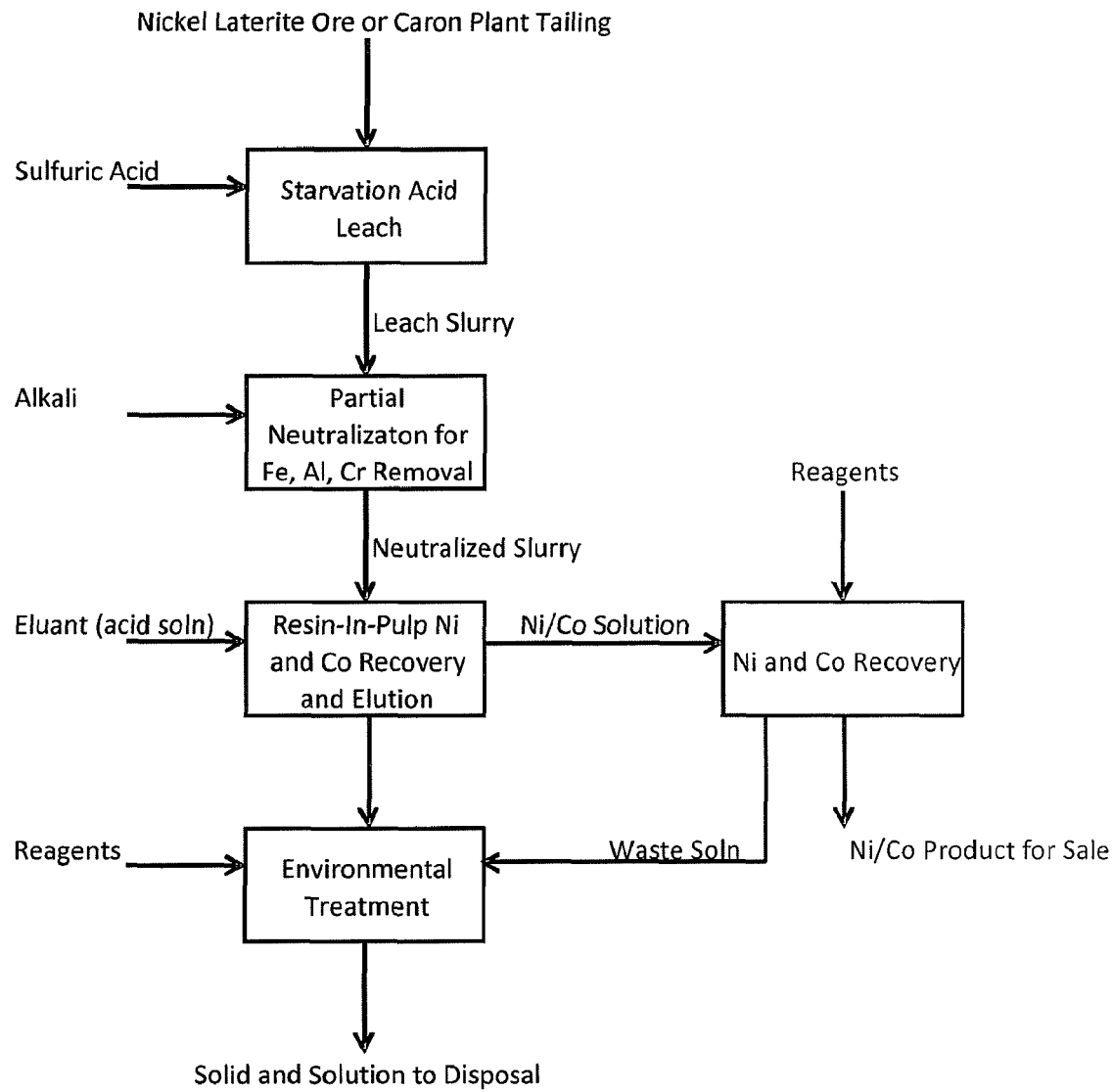
FIG. 2 is a flowsheet showing the leaching of the lean ore with starvation levels of acid followed by partial neutralization to precipitate contaminating elements, the use of resin-in-pulp ion exchange recovery for nickel and cobalt and elution of the loaded resin to produce the nickel and cobalt-containing solution, nickel and cobalt recovery and finally environmental treatment of waste solids and liquid effluents.

An alternative process for nickel and cobalt recovery involves a resin-in-pulp process (FIG. 2). The resin-in-pulp process may involve the countercurrent movement of resin particles through a series of tanks equipped with screens to separate the resin particles from the particles of partially leached ore material. The size of the resin particles may accordingly be selected to be coarser than the coarsest particles of slurry solids. There may be a plurality of stages of countercurrent adsorption, for example between 2 and 10 or more in the range of 3 to 4. In some embodiments, a suitable resin adsorbent for nickel and cobalt recovery would be a resin of the iminodiacetic acid chelation type. For example, the Lanxess resin TP207 may be used. The loaded resin may be recovered by screening (or other suitable means) and directed to washing and acid elution for the recovery of nickel and cobalt from the eluate.

In some embodiments, air or oxygen or a chemical oxidant may be added during the leach process, so as to oxidize the ferrous iron that is leached. In any event, in alternative embodiments, oxidation of reduced iron will be required either during leaching or prior to the resin in pulp step. Iron removal and pH adjustment may only be necessary if the resin-in-pulp method of nickel and cobalt recovery is practiced, with particular resins. If solid-liquid separation using thickeners or filters is used, then iron removal and pH adjustment may be deferred. Further, there are resins that may not require pH adjustment (eg. Dowex M4195 by the Dow company) that may be used directly to recover nickel and cobalt in the presence of dissolved iron (resins that are selective for nickel and cobalt, so that residual iron in solution will not interfere with separation).

The nickel and cobalt-containing solution recovered from either the solid-liquid separation circuit or the resin-in-pulp circuit may be directed to a nickel and cobalt product recovery step. This may include one or more of the steps of mixed hydroxide precipitation, mixed sulphide precipitation, solvent extraction or ion exchange recovery of nickel and cobalt; followed by metal electrolysis, precipitation or reduction to metal.

The environmental streams emanating from processes of the invention may be treated to meet environmental regulations, including streams emanating from the solid-liquid separation circuit, the resin-in-pulp barren slurry, and/or solutions or solid residues from the nickel and cobalt recovery step. This may for example involve further neutralization with limestone or lime before deposition in a waste impoundment.

EXAMPLES

Example 1

Acid leaching of Caron Plant Tailings 100 g of Caron plant tailings analyzing 0.51% Ni and 0.054% Co were leached in a series of four experiments. The full analysis of the tailing material is shown in Table 1.

TABLE 1

Elemental analysis of Caron plant tailings.

| Al % | Ca % | Co g/t | Cu g/t | Fe % | Mg % | Mn g/t | Ni g/t | Zn g/t |
|---|---|---|---|---|---|---|---|---|
| 3.39 | 0.44 | 538 | 1144 | 30.86 | 3.40 | 7452 | 5072 | 436 |

A slurry having a pulp density of 100 g of tailings slurried in 1 L of water was prepared. For the four experiments, 10, 25, 50 or 100 g of concentrated sulphuric acid were added, corresponding to additions of 100, 250, 500 or 1000 kg $H_2SO_4$/t tailing. The corresponding extractions of nickel and cobalt are shown in Table 2. The total leach time was 48 h at 50° C.

TABLE 2

Extractions of nickel and cobalt for varying amounts of concentrated sulphuric acid added to Caron plant tailings.

| Test | Temperature (° C.) | Amount of Acid (kg/t) | Ni Extraction (%) | Co Extraction (%) |
|---|---|---|---|---|
| I | 50 | 100 | 36.51 | 65.34 |
| II | 50 | 250 | 52.93 | 76.47 |
| III | 50 | 500 | 61.94 | 82.10 |
| IV | 50 | 1000 | 72.19 | 91.32 |

Figure 3:
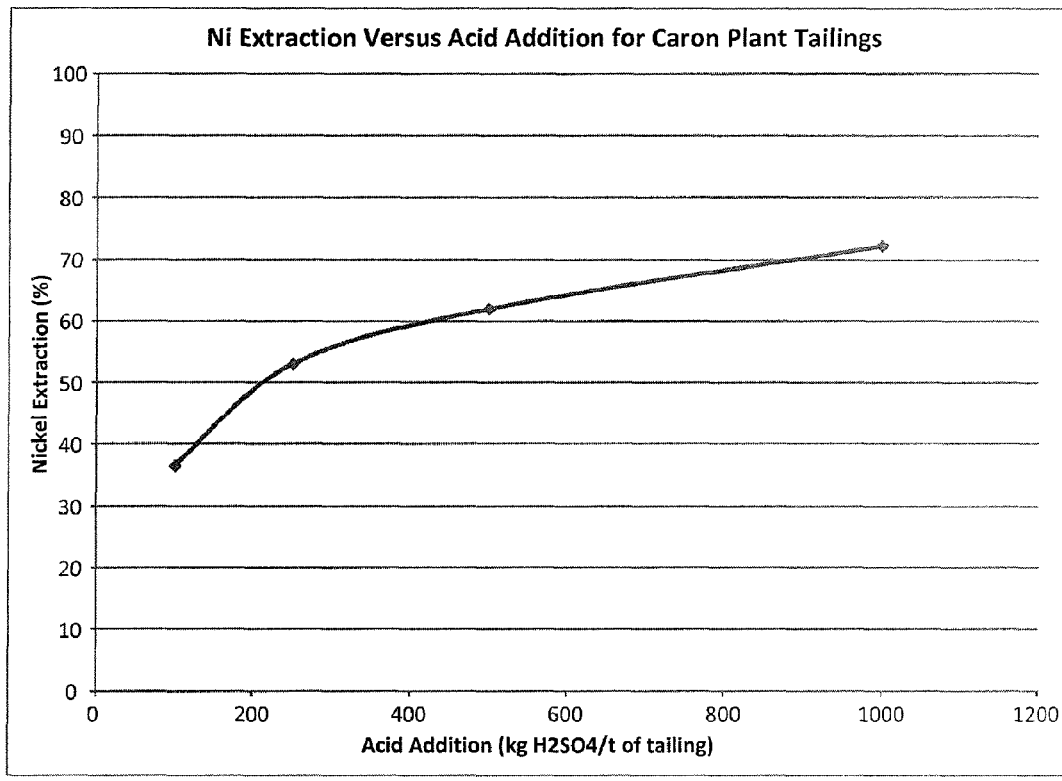
FIG. 3 is a graph that shows the extraction of nickel as a function of acid addition for the leaching of a sample of Caron plant tailing.
Figure 4:
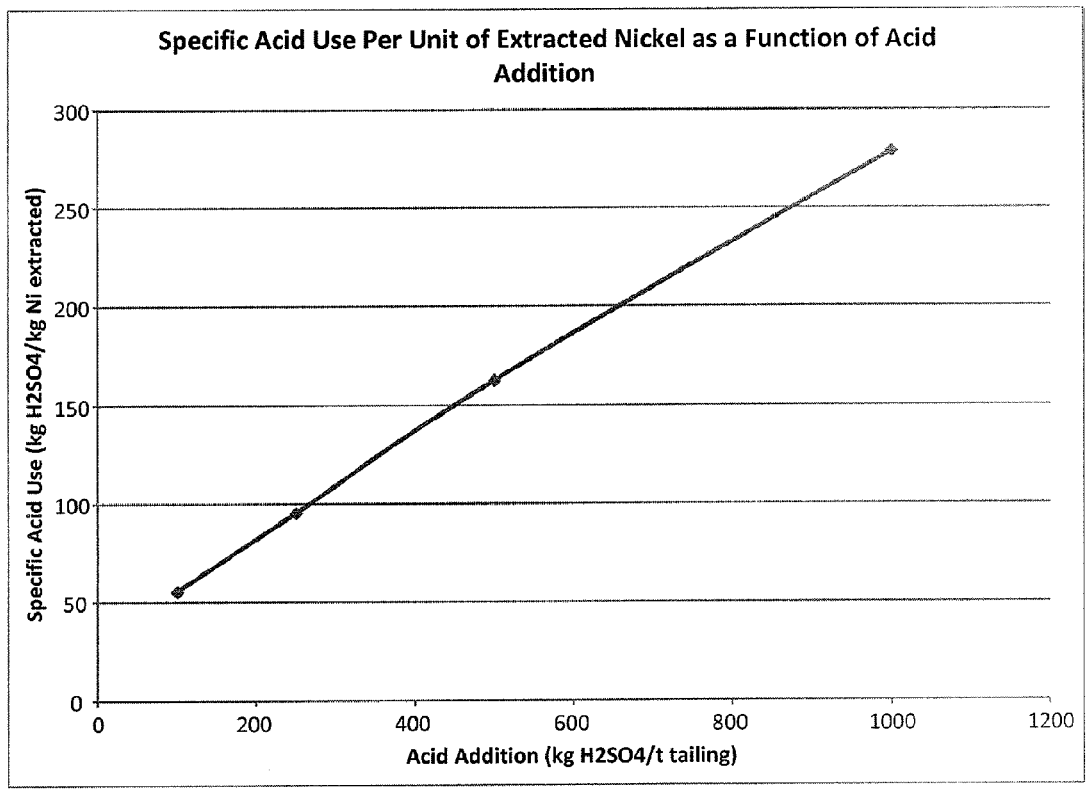
FIG. 4 is a graph that shows the specific use of acid per unit of nickel extraction as a function of acid addition for the leaching of the sample of Caron plant tailing.

FIG. 3 shows that the addition of ever greater amounts of acid in the range of 100 to 1000 kg $H_2SO_4$/t tailing produces incremental increases in nickel recovery. Using the same test data, the specific use of acid as a function of acid addition is illustrated in FIG. 4 and shows that with ever higher acid addition, the use of acid increases more than 5-fold from 55 to 278 kg $H_2SO_4$/kg of Ni extracted. The range of acceptable acid addition may be calculated based on economic principles for each case, and may for example fall in the range of 50 to 300 kg $H_2SO_4$/t or more specifically, in the vicinity of 100 kg $H_2SO_4$/t.

Example 2

Acid Leaching of Caron Plant Tailings at Variable Temperature with Oxygen Sparging 100 g of Caron plant tailings was slurried in 1 L of water for each of four tests at temperatures from 50° C. to 80° C. with sparging of oxygen. 10 g of concentrated sulphuric acid was added to each test corresponding to 100 kg $H_2SO_4$/t tailing. The corresponding extractions of nickel and cobalt are shown in Table 3. The total leach time was 48 h. There is a clear benefit in operation at higher temperature with respect to better overall extraction of nickel and cobalt.

TABLE 3

Extractions of nickel and cobalt from Caron plant tailings at various temperatures.

| Test | Temperature (° C.) | Amount of Acid (kg/t) | $O_2$ Addition | Ni Extraction (%) | Co Extraction (%) |
|---|---|---|---|---|---|
| XVI | 50 | 100 | Yes | 41.90 | 64.56 |
| XVII | 60 | 100 | Yes | 45.74 | 64.11 |
| XVIII | 70 | 100 | Yes | 51.13 | 69.73 |
| XIX | 80 | 100 | Yes | 53.29 | 70.66 |

Example 3

Acid Leaching of Nickel Saprolite Ore with 100 and 200 kg $H_2SO_4$/t Ore

A nickel saprolite ore was obtained with the composition shown in Table 4. The ore sample was ground to a P80 of 50 μm particle size in a laboratory grinding mill.

TABLE 4

Elemental analysis of a nickel saprolite ore.

| SiO₂ % | Cu ppm | Zn ppm | Co ppm | Ni ppm | Cr ppm | Mn ppm | Al % | Ca % | Fe % | Mg % |
|---|---|---|---|---|---|---|---|---|---|---|
| 43.05 | 28 | 142 | 122 | 5108 | 3407 | 1194 | 0.91 | 0.21 | 7.77 | 17.13 |

For each of two experiments, 500 g of saprolite ore was slurried in 1 L of deionized water in a beaker. 50 or 100 g of concentrated sulphuric acid was added to each of two tests corresponding to acid additions of 100 and 200 kg $H_2SO_4$/t tailing, respectively. The total leach time was 48 h at 80° C. Both of the mixtures were agitated at 900 rpm. Following the acid leach, each slurry was subjected to a solid-liquid separation and washing with deionized water to separate the nickel and cobalt-containing solution from the solids. The wash volume for the addition of 100 kg $H_2SO_4$/t tailing was 1500 mL and following separation and washing, the solids had a mass of 462.8 g. The wash volume for the addition of 200 kg $H_2SO_4$/t tailing was 2470 mL and following separation and washing, the solids had a mass of 405.78 g.

The results achieved were to realize 35.7% Ni extraction at 100 kg/t acid addition and 50.05% Ni extraction at 200 kg/t acid addition. The comparable numbers for cobalt were 62.16% and 70.92%, respectively. In terms of Fe extraction, only 0.25% Fe was extracted at 100 kg/t acid addition and 3.16% Fe was extracted at 200 kg/t acid addition. All extractions are reported as metal in solution versus metal in the original 500 g of feed material.

In each case the acid was nearly completely reacted. For the first test (100 kg/t acid), the final pH was 2.80 (Table 5) and in the second case (200 kg/t acid) the pH was 1.25 (Table 6), indicating slightly greater residual acid in solution. If the Redox potential is high (eg. +700 mV), then this may indicate that excess $MnO_2$ containing Co may be present in the solids. This may give a low value of Co extraction, that could be improved in some embodiments by addition of a soluble reductant. For example, sulfur dioxide may be added to effect a reduction in the oxidation potential and the leaching of oxidized forms of manganese and cobalt by the following putative reactions:

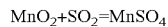
$MnO_2 + SO_2 = MnSO_4$

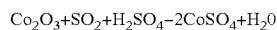
$Co_2O_3 + SO_2 + H_2SO_4 = 2CoSO_4 + H_2O$

TABLE 5 pH and redox potential of nickel saprolite ore slurry at various time intervals to which 100 kg of $H_2SO_4$/t of ore was added.

Samples

| Sample Name | Time (h) | pH (80° C.) | Redox (80° C., + 200 mV) | V (mL) |
|---|---|---|---|---|
| VII 0 h | 0 | 0.49 | 573 | 10 |
| VII 1 h | 1 | 1.74 | 670 | 7.0 |
| VII 2 h | 2 | 2.00 | 657 | 8.0 |
| VII 4 h | 4 | 2.17 | 647 | 8.0 |
| VII 8 h | 8 | 2.30 | 630 | 8.0 |
| VII 24 h | 24 | 2.49 | 578 | 8.0 |
| VII 32 h | 32 | 2.60 | 541 | 7.5 |
| VII 48 h | 48 | 2.80 | 480 | 510 |

TABLE 6 pH and redox potential of nickel saprolite ore slurry at various time intervals to which 200 kg of $H_2SO_4$/t of ore was added.

Samples

| Sample Name | Time (h) | pH (80° C.) | Redox (80° C., + 200 mV) | V (ml) |
|---|---|---|---|---|
| VIII 0 h | 0 | 0.04 | 567 | 10 |
| VIII 1 h | 1 | 1.15 | 569 | 7.5 |
| VIII 2 h | 2 | 1.45 | 539 | 8.0 |
| VIII 4 h | 4 | 1.70 | 518 | 7.0 |
| VIII 8 h | 8 | 1.86 | 500 | 7.0 |
| VIII 24 h | 24 | 1.42 | 484 | 7.0 |
| VIII 32 h | 32 | 1.19 | 409 | 7.0 |
| VIII 48 h | 48 | 1.25 | 467 | 470 |

The acid consumption calculated from the major elements dissolved in solution is reported in Tables 7 and 8. For the 100 kg/t acid addition, the soluble metals (Al, Ca, Co, Cu, Fe, Mg, Mn, Ni and Zn) accounted for 79.9 kg/t acid consumption (Table 7). The difference is likely due to formation of some gypsum and possibly some jarosite during the leach ($CaSO_4 \cdot 2H_2O$ and $NaFe_3(SO_4)_2(OH)_6$). These solid precipitates consume acid (sulphate) in their chemistry of formation.

TABLE 7

Mass balance for nickel saprolite ore slurry to which 100 kg $H_2SO_4$/t of ore was added.

| | Mass/Vol | Al | Ca | Co | Cu | Fe | Mg | Mn | Ni | Zn |
|---|---|---|---|---|---|---|---|---|---|---|
| Input | | | | | | | | | | |
| Feed Sample | 500 | 0.91 | 0.21 | 122 | 28 | 7.77 | 17.13 | 1194 | 5108 | 142 |
| Units | Total | 4.550 | 1.050 | 0.061 | 0.014 | 38.85 | 85.65 | 0.597 | 2.554 | 0.071 |
| Output | | | | | | | | | | |
| Residue | 462.8 | 0.87 | 0.08 | 72 | 46 | 8.06 | 16 | 489 | 3544 | 114 |
| Solutions | | | | | | | | | | |
| VII 1 h | 7.0 | 548.4 | 517.9 | 22.27 | 4.91 | 1789 | 5745 | 206.83 | 725.01 | 12.91 |
| VII 2 h | 8.0 | 542.2 | 516.3 | 26.01 | 5.14 | 1652 | 6308 | 241.32 | 756.05 | 14.40 |
| VII 4 h | 8.0 | 543.4 | 518.4 | 29.41 | 5.40 | 1476 | 6823 | 276.18 | 797.79 | 15.83 |
| VII 8 h | 8.0 | 514 | 524.7 | 31.35 | 5.34 | 1243 | 7283 | 306.97 | 842.58 | 16.75 |
| VII 24 h | 8.0 | 476.6 | 524.9 | 36.90 | 4.90 | 382 | 7711 | 352.96 | 897.08 | 18.14 |

TABLE 7-continued

Mass balance for nickel saprolite ore slurry to which 100 kg H$_2$SO$_4$/t of ore was added.

|  | Mass/Vol | Al | Ca | Co | Cu | Fe | Mg | Mn | Ni | Zn |
|---|---|---|---|---|---|---|---|---|---|---|
| VII 32 h | 7.5 | 417.4 | 506 | 36.75 | 4.44 | 165.15 | 8044.5 | 372.72 | 925.19 | 17.34 |
| VII 48 h | 510.0 | 429.5 | 502.2 | 44.91 | 4.28 | 70.78 | 9480.1 | 460.01 | 1102.84 | 14.23 |
| VII Wash | 1500.0 | 69.4 | 279.2 | 9.06 | 0.62 | 5.09 | 2144.8 | 85.73 | 207.32 | 2.87 |
| Units |  |  |  |  |  |  |  |  |  |  |
| Residue |  | 4.026 | 0.370 | 0.033 | 0.021 | 37.302 | 74.048 | 0.226 | 1.640 | 0.053 |
| Solutions |  | 0.004 | 0.004 | 0.000 | 0.000 | 0.013 | 0.040 | 0.001 | 0.005 | 0.000 |
| VII 2 h |  | 0.004 | 0.004 | 0.000 | 0.000 | 0.013 | 0.050 | 0.002 | 0.006 | 0.000 |
| VII 4 h |  | 0.004 | 0.004 | 0.000 | 0.000 | 0.012 | 0.055 | 0.002 | 0.006 | 0.000 |
| VII 8 h |  | 0.004 | 0.004 | 0.000 | 0.000 | 0.010 | 0.058 | 0.002 | 0.007 | 0.000 |
| VII 24 h |  | 0.004 | 0.004 | 0.000 | 0.000 | 0.003 | 0.062 | 0.003 | 0.007 | 0.000 |
| VII 32 h |  | 0.003 | 0.004 | 0.000 | 0.000 | 0.001 | 0.060 | 0.003 | 0.007 | 0.000 |
| VII 48 h |  | 0.219 | 0.256 | 0.023 | 0.002 | 0.036 | 4.835 | 0.235 | 0.562 | 0.007 |
| VII Wash |  | 0.104 | 0.419 | 0.014 | 0.001 | 0.008 | 3.217 | 0.129 | 0.311 | 0.004 |
| Total | | 4.373 | 1.069 | 0.071 | 0.025 | 37.397 | 82.426 | 0.603 | 2.552 | 0.065 |
| Balance (IN − OUT)/IN (%) | | 3.9 | −1.8 | −16.8 | −76.0 | 3.7 | 3.8 | −1.0 | 0.1 | 8.4 |
| Extraction (%) | | 7.62 | 66.57 | 62.16 | 23.91 | 0.25 | 9.78 | 63.13 | 35.70 | 17.33 |
| Acid Consumption (g) | | 1.89 | 1.71 | 0.06 | 0.01 | 0.25 | 33.80 | 0.67 | 1.52 | 0.02 |
| Total Acid Consumption | 39.9 g | | | | | | | | | |
|  | 79.9 | kg/t | | | | | | | | |

Similarly, for the test at 200 kg H$_2$SO$_4$/t, the acid consumption calculation showed a value of 161 kg/t saprolite (Table 8). The consumption of acid is (as expected) largely driven by the dissolution of magnesium. The other major contributors are Al, Ca, Fe, Mn and Ni. Minor acid consumption is attributed to Co, Cu, Zn.

TABLE 8

Mass balance for nickel saprolite ore slurry to which 200 kg H$_2$SO$_4$/t of ore was added.

|  | Mass/Vol | Al | Ca | Co | Cu | Fe | Mg | Mn | Ni | Zn |
|---|---|---|---|---|---|---|---|---|---|---|
| Input |  |  |  |  |  |  |  |  |  |  |
| Feed Sample | 500 | 0.91 | 0.21 | 122 | 28 | 7.77 | 17.13 | 1194 | 5108 | 142 |
| Units | Total | 4.55 | 1.05 | 0.06 | 0.01 | 38.85 | 85.65 | 0.60 | 2.55 | 0.07 |
| Output |  |  |  |  |  |  |  |  |  |  |
| Residue | 405.78 | 0.8 | 0.09 | 62 | 38 | 7.98 | 14 | 450 | 2946 | 93 |
| Solutions |  |  |  |  |  |  |  |  |  |  |
| VII 1 h | 7.5 | 994.9 | 564.3 | 42.32 | 11.40 | 4008.71 | 15126.1 | 407.06 | 1276.66 | 84.24 |
| VII 2 h | 8.0 | 1001.3 | 522.6 | 45.67 | 12.07 | 4071.93 | 16975 | 444.95 | 1358.20 | 91.80 |
| VII 4 h | 7.0 | 937.8 | 537.6 | 44.31 | 11.42 | 3764.44 | 17258.4 | 437.09 | 1320.96 | 87.04 |
| VII 8 h | 7.0 | 930.3 | 529.3 | 45.14 | 11.44 | 3575.25 | 17729.3 | 444.96 | 1311.89 | 88.96 |
| VII 24 h | 7.0 | 862.7 | 540.1 | 44.19 | 11.00 | 2399.43 | 18093.3 | 435.67 | 1329.15 | 85.22 |
| VII 32 h | 7.0 | 836.3 | 566.5 | 43.78 | 10.69 | 1985.37 | 17935.4 | 428.21 | 1335.31 | 85.31 |
| VII 48 h | 470.0 | 980.8 | 564.8 | 51.74 | 12.44 | 1523.15 | 21540.6 | 498.51 | 1588.19 | 92.00 |
| VII Wash | 2470.0 | 112.8 | 166.3 | 6.89 | 1.47 | 148.79 | 2445.6 | 59.53 | 192.01 | 11.54 |
| Units |  |  |  |  |  |  |  |  |  |  |
| Residue |  | 3.246 | 0.365 | 0.025 | 0.015 | 32.381 | 56.809 | 0.183 | 1.195 | 0.038 |
| Solutions |  | 0.007 | 0.004 | 0.000 | 0.000 | 0.030 | 0.113 | 0.003 | 0.010 | 0.001 |
| VII 2 h |  | 0.008 | 0.004 | 0.000 | 0.000 | 0.033 | 0.136 | 0.004 | 0.011 | 0.001 |
| VII 4 h |  | 0.007 | 0.004 | 0.000 | 0.000 | 0.026 | 0.121 | 0.003 | 0.009 | 0.001 |
| VII 8 h |  | 0.007 | 0.004 | 0.000 | 0.000 | 0.025 | 0.124 | 0.003 | 0.009 | 0.001 |
| VII 24 h |  | 0.006 | 0.004 | 0.000 | 0.000 | 0.017 | 0.127 | 0.003 | 0.009 | 0.001 |
| VII 32 h |  | 0.006 | 0.004 | 0.000 | 0.000 | 0.014 | 0.126 | 0.003 | 0.009 | 0.001 |
| VII 48 h |  | 0.461 | 0.265 | 0.024 | 0.006 | 0.716 | 10.124 | 0.234 | 0.746 | 0.043 |
| VII Wash |  | 0.279 | 0.411 | 0.017 | 0.004 | 0.368 | 6.041 | 0.147 | 0.474 | 0.029 |
| Total | | 4.0263 | 1.0650 | 0.0684 | 0.0254 | 33.6093 | 73.7203 | 0.5828 | 2.4737 | 0.1133 |
| Balance (IN − OUT)/IN (%) | | 11.5 | −1.4 | −12.2 | −81.4 | 13.5 | 13.9 | 2.4 | 3.1 | −59.5 |
| Extraction (%) | | 17.14 | 66.65 | 70.92 | 71.23 | 3.16 | 19.74 | 67.03 | 50.05 | 106.39 |
| Acid Consumption (g) | | 4.25 | 1.71 | 0.07 | 0.02 | 3.23 | 68.24 | 0.71 | 2.14 | 0.11 |
| Total Acid Consumption | 80.5 | g | | | | | | | | |
|  | 161.0 | kg/t | | | | | | | | |

The Ni, Co, Zn, Cu, Mn levels increased during each leach example. The Mg level starts high and finishes higher as the major source of acid consumption. The Al level in solution peaks and declines slowly for the 100 kg/t example while it is almost unchanged at the end for the 200 kg/t example. The Fe level in solution peaks at 1789 mg/L for the 100 kg/t example and declines to 71 mg/L. This is due to hydrolysis of the $Fe_2(SO_4)_3$ to form jarosite with consequent release of acid. This is a favourable reaction as the acid released upon Fe precipitation continues to leach Ni and other metals. As a result, lower amounts of acid may be used to obtain reasonable recoveries of nickel and cobalt.

$$3Fe_2(SO_4)_3 + H_2O = 2(H_3O)Fe_3(SO_4)_2(OH)_6 + 5H_2SO_4$$

For the 200 kg/t example, the Fe in solution peaked at over 4000 mg/L and declined to around 1500 mg/L by the same reaction.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as any open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing.

Citation of references herein is not an admission that such references are prior art to the present invention nor does it constitute any admission as to the contents or date of these documents.

The invention claimed is:

1. A method for recovering nickel and cobalt from a lean ore comprising about 7% to about 40% iron, less than about 1.5% nickel and less than about 0.2% cobalt, the method comprising:
   leaching a slurry of the lean ore with about 50 to about 300 kg of an acid solution per tonne of lean ore for about 3 hours to about 72 hours at a temperature between ambient to about the boiling point of the solution to form a leach slurry, wherein less than about 3.5% of iron present in the lean ore is extracted during leaching;
   adding an alkali to the leach slurry to adjust the pH of the slurry to a range of about 3.5 to about 5 and to precipitate contaminating elements, wherein a neutralized slurry is formed; and
   either:
   (a) separating a nickel and cobalt-containing solution from the neutralized slurry; or
   (b) extracting nickel and cobalt from the neutralized slurry using a resin-in-pulp process to form a loaded resin;
   washing the loaded resin; and
   eluting nickel and cobalt from the loaded resin using a second acid to form a nickel and cobalt-containing solution; and
   recovering nickel and cobalt from the nickel and cobalt-containing solution, wherein about 60% to about 70% of the cobalt and about 30% to about 55% of the nickel present in the lean ore is recovered.

2. The method according to claim 1, wherein the acid is $H_2SO_4$.

3. The method according to claim 1, wherein the lean ore is leached with about 100 to about 200 kg of the acid per tonne of lean ore.

4. The method according to claim 1, wherein the lean ore is leached with about 100 kg of the acid per tonne of lean ore.

5. The method according to claim 1, wherein the temperature is about 80° C.

6. The method according to claim 1, wherein the lean ore is a nickel laterite ore.

7. The method according to claim 1, wherein the lean ore is a process tailing.

8. The method according to claim 7, wherein the process tailing is a Caron plant tailing.

9. The method according to claim 1, wherein the ore is leached for about 24 to about 48 hours.

10. The method according to claim 1, further comprising adding a reductant during leaching.

11. The method according to claim 10, wherein the reductant is sulphur dioxide.

12. The method according to claim 1, further comprising aerating or oxygenating the leach slurry prior to or during the addition of an alkali to the leach slurry.

13. The method according to claim 1, wherein the contaminating elements are iron, aluminum, silicon, chromium, zinc, magnesium, manganese, copper or any combination thereof.

14. The method according to claim 1, wherein the alkali is limestone, lime, magnesia, soda ash or sodium hydroxide.

15. The method according to claim 1, wherein less than about 1% of iron present in the lean ore is extracted during leaching.

* * * * *